Figure 1:
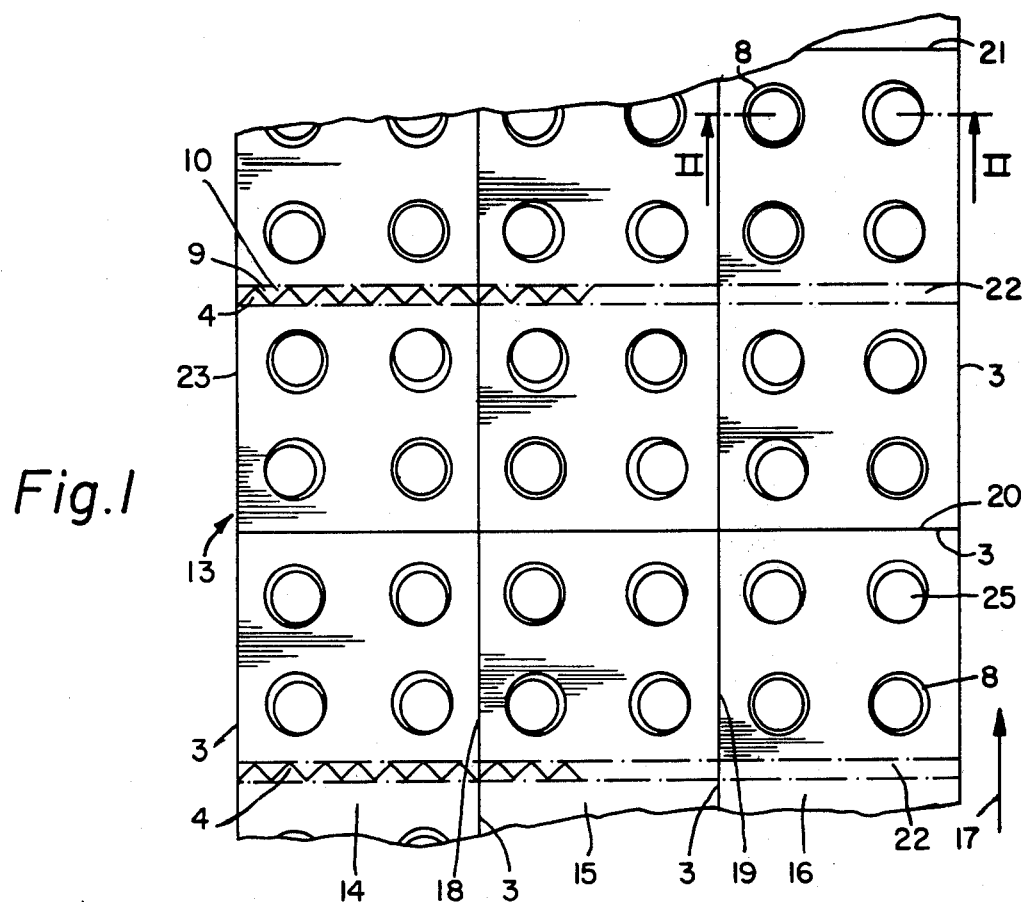

United States Patent [19]

Hirt

[11] 4,398,635

[45] Aug. 16, 1983

[54] CHILD-PROOF MEDICATION PACKAGE

[75] Inventor: Edmund Hirt, Stuttgart, Fed. Rep. of Germany

[73] Assignee: American Can Company, Greenwich, Conn.

[21] Appl. No.: 403,904

[22] Filed: Jul. 30, 1982

Related U.S. Application Data

[63] Continuation of Ser. No. 288,359, Jul. 30, 1981, abandoned.

[51] Int. Cl.³ .................... B65D 83/04; B65D 85/42
[52] U.S. Cl. .................................. 206/532; 206/602
[58] Field of Search ............... 206/532, 538, 602, 603, 206/620

[56] References Cited

U.S. PATENT DOCUMENTS

| | | | |
|---|---|---|---|
| 3,872,970 | 3/1975 | Edison | 206/532 |
| 3,941,248 | 3/1976 | Moser et al. | 206/532 |
| 4,011,949 | 3/1977 | Braber et al. | 206/532 |
| 4,294,361 | 10/1981 | Margulies | 206/532 |

FOREIGN PATENT DOCUMENTS 2360922  6/1974  Fed. Rep. of Germany ...... 206/532

Primary Examiner—Joseph Man-Fu Moy
Attorney, Agent, or Firm—Stuart S. Bowie

[57] ABSTRACT

This invention relates to a child-proof medication package where the medication is arranged between sheets, where an individual accommodation chamber is provided for each drug unit, which is formed by heat-sealing of the sheets and which is accessible from the edge by notch-tearing of the package.

6 Claims, 6 Drawing Figures

CHILD-PROOF MEDICATION PACKAGE

This is a continuation of application Ser. No. 288,359, filed 7/30/81, now abandoned.

BACKGROUND

In the art there are already known various proposals for the child-proof packaging of medication or other items, i.e., to package them in such a way that a child cannot have access to the packaged substance. Medication, in other words, for example pills, suppositories or similar items require such a packaging in particular in view of the fact that one must in principle reckon with the fact that the child observes the use of the medication/drug by the adult and wants to imitate this process, particularly in view of the fact that the medication/drugs are frequently color-coded and, on that account alone, exert a certain attraction on the child who believes the medication/drugs to constitute usually candy or similar sweets.

Medication/drugs can be packaged in small boxes, cans, or similar containers and it is possible to design the closure in such a way that the child is incapable of opening it. In that regard, use is made particularly of the fact that the child is capable of providing only a limited force or is incapable of opening a somewhat more complex mechanism.

Packages of this type are however satisfactory in part only. If a package having a substantial amount of medication/drugs has, for some reason, been opened or remained open, there exists a considerable hazard since, in that case, a plurality of medicated units can be misused simultaneously. It is therefore to be preferred to retain the individual packaging of medication/drugs in order to minimize as much as possible any damage or injury in the event of failure of the precautionary measures.

The application of any closures with individually packaged medication/drugs is quite naturally even more difficult and has in principle not been solved. One must reckon with the imitation drive and also with the fact that the normal opening method will be recognized and imitated by the child.

An added particular problem in the case of individual packaging, for instance between sheets, is that the frequently colored medication/drug is visible from the outside and exerts therefore an additional attractiveness. It is true that packaging in nontransparent sheets is possible, however this does in principle not solve the problem and reduces moreover the important color-coding effect of the medication.

It has therefore been an objective of the invention to create a child-proof medication/drug package where all essential advantages of the individual package are retained, where the medication/drug continues to be visible in particular also from the outside, and where adequate precautions are taken in order that a child will not be in the position to get to the medication/drug itself. Nevertheless, it is to be possible for the adult to open the package rapidly and without any special tools. The package intended to be created by the invention is therefore to be usable in like manner with any medication/drug irrespective of its particular mode of administration so that the package can be utilized universally, and so that the device by means of which the package is being manufactured can likewise be utilized to its full capacity.

A further object of the invention resides in maintaining manufacturing cost within reasonable limits in spite of the additional modes of operation.

To solve this object, the invention is based on a child-proof medication/drug package of the type described above. In accordance with the invention, it is being proposed that the two sheets heat-sealed or welded with one another be endowed with such a strength and/or ductility that a tear cannot be made therein without a special tool, nor can the medication/drug be forced through one of the sheets, that nicks are provided at the edge, with such a nick being assigned at least to each accommodation chamber and that the tearing force to be applied while using the nick is even greater than the force that can as a rule be furnished by a child.

The invention is based on the following considerations:

A child-proof medication/drug package may not be built on the principle that the child does not recognize how the package is being opened or, in other words, that the child, as a result of inadequate intelligence performance, would not be capable of recognizing the particular features of the safety device. As a rule, it is being assumed that packages are to be protected against children up to about eight years of age so that such considerations that are based exclusively on intelligence are inadequate.

In the case of this invention, the package is designed so strong, that is to say the sheets that are used for forming the accommodation chambers have such a strength or resistance or ductility of the material that even an adult is unable to open up the package by tearing the package open from the edge or to force the medication/drug out of the accommodation chambers, in which case it would be necessary to force it through the sheet.

If special measures would not be taken, the opening of the package would encounter problems even for adults and could not be achieved without tools.

Now the mere use of tools would not be a solution because even a child can proceed along this path and, moreover, in many instances the availability of a tool cannot be presumed to exist.

In order to achieve nevertheless the opening of the package, this invention proposes marginal notches that are however of such a configuration that, by means of the notch, only an adult, however not a child, is capable of opening the package.

It was found that the mere traction that a child's hands are able to muster is relatively large so that a reliable protection could not be sought along these lines. If, however, the opening can be achieved only by the use of a notch, it is necessary in order to accomplish the opening cycle to generate in addition to the traction to be mustered by the hands also an adequate clamping effect by means of the fingers near the fingertips. It was found that it is in particular with regard to the compressive strength that can be mustered between two fingers near the fingertips that children achieve markedly lower values. One must add to this fact that it does not suffice to have a merely adequate firm hold on the package. The compressive force must be applied to both sides of the notch for it is only then that the notch can be used as a tear-open aid. Even this particular feature that is a consequence of the proposal in accordance with the invention constitutes an additional safety element.

On the one hand, the child will not recognize that the tear-open process succeeds only if one applies the grip closely to both sides of the notch and even if this is recognized, the process cannot be imitated.

Packages for a variety of merchandise, which use notches as a tear-open aid are per se known in the packaging field. The notches were however not intended to provide any protection function with a view to child safety and did also not possess same. Their sole objective was to facilitate opening a larger-size package that, naturally, was made out of sturdier sheets. In particular, in the case of those tear-open aids it was also not material to place the limit between the capability or the lack of capability of achieving a tearing-in in the range that can no longer be mastered by an eight-year-old child, whereas it can be mastered already by a person of an older age group.

As a further improvement it is proposed to design the notches in combination with a serrated edge. The notch can for instance be angular and be formed by two marginal portions oriented substantially at right angles. The notch can however be formed also by a short incision and, with a variant of the invention, it is even possible to arrange the incision in the internal point of intersection of marginal portions oriented angularly to one another. In this case, the tear-open aid consists essentially of two elements, on the one hand, the angular incision and, on the other, the short rectilinear incision.

It was found that it is advantageous to arrange the individual notches at a spacing of approximately 5-7 millimeters.

As a result of this arrangement, the user is compelled to achieve a hold within this narrow area. If the edge of the package is being seized only within a larger spacing having a plurality of incisions or notches, opening can as a rule not be successfully materialized.

In general it is sufficient if the package is provided with such notches at only one of its edges. The other edges may be rectilinear which facilitates manufacture on the packaging machines.

It is however likewise possible to provide the notches at all edges, which is recommendable in particular in the case of large-size packages.

THE DRAWINGS

Figure 2:
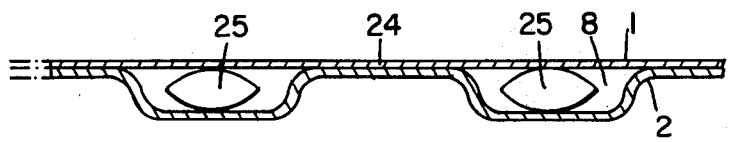
Figure 3:
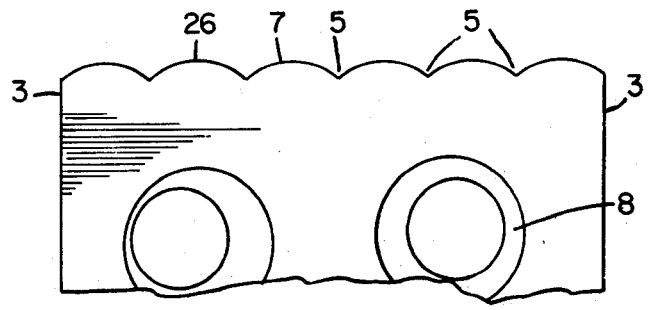
Figure 4:
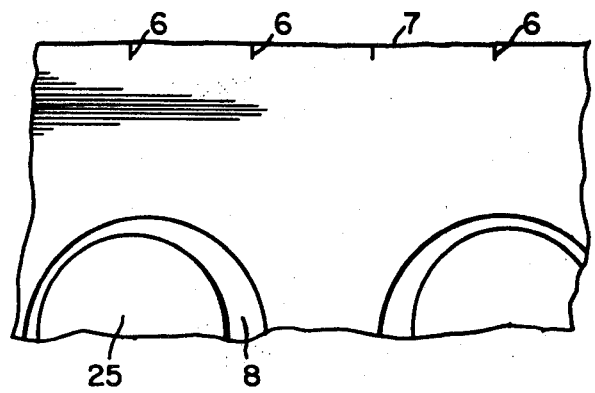
Figure 5:
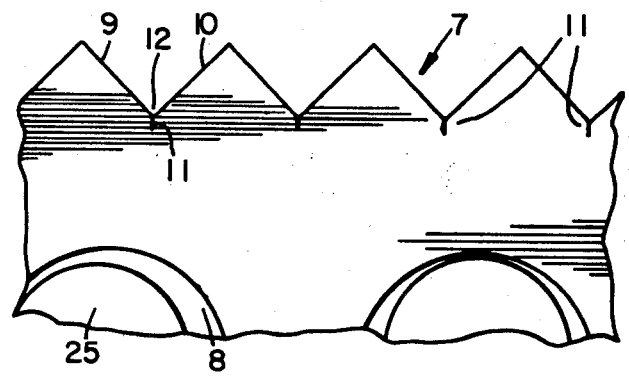
Figure 6:
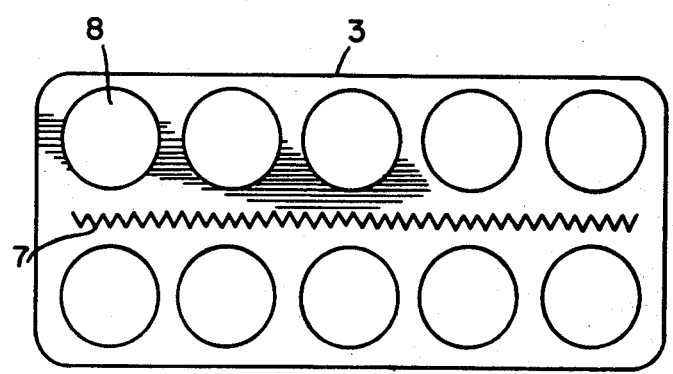

The drawings illustrate schematically some exemplified embodiments of the invention and shows in:

FIG. 1 a top view on packages in accordance with the invention, in the form in which they emerge for instance from a manufacturing machine, FIG. 2 a cross-sectional representation through the representation of FIG. 1 along the sectional line II—II, FIG. 3 a modified exemplified embodiment of the invention and in FIGS. 4, 5 and 6 representations of segments taken from packages in accordance with the invention in another mode of realization, respectively a further exemplified embodiment.

DISCLOSURE

In the representation of FIG. 1 there is shown a strip 13 of medication/drug packages, which consists of three interconnected rows 14, 15, and 16 that emerge from a manufacturing machine for instance in the direction of the arrow 17. Owing to the cuts 18 and 19, the individual rows are subdivided in per se known manner and even the cross-sections 20 and 21 are in standard manner rectilinear. Thanks to the cross-cuts 22 in the design in accordance with the invention, the packages are provided with an opening aid and could otherwise not be opened on account of corresponding thickness of the sheets at one of the edges formed by the cuts 18-21 or at the outer edge 23. The closure that is now safe is conditioned essentially by the quality of the two sheets 1 and 2 respectively by their thickness, as well as the fact that the sheets 1 and 2 are heat-sealed or welded with one another along the surface 24. As a result, the accommodation chambers 8, which are usually formed in sheet 1 by any of several conventional forming processes, with the drugs 25, are not accessible.

The cut 22 is designed in zigzag shape and produces a plurality of notches 4 in the packages adjoining this cut. The notches 4 are defined in each case by the rectilinear edge portions 9 and 10.

It is obvious that a slightly acute angle will improve the tear-open capability between the rectilinear edge portions 9 and 10, and that the length of the edge portions 9 and 10 does also facilitate opening.

FIG. 3 illustrates an edge 7 of another design in which the notches 5 are made up of arc-shaped sections 26. The packaging illustrated cannot be opened from the rectilinear edge 3.

In the case of the exemplified embodiment according to FIG. 4, the notches 6 consist of small incisions in the edge, with the incisions penetrating into the material over a short distance only, without forming a V-shaped notch.

In the case of the exemplified embodiment according to FIG. 5, at the point of intersection 12 of the rectangular edge portions 9 and 10 there have been arranged incisions 11 that may for instance be equated with the incisions 6.

The shape of the incisions illustrated is to be understood by way of example only and there exist in particular far-reaching configuration possibilities of the edge portions between the respective incisions or notches. It is possible to provide for each of the accommodation chambers 8 a particular incision or notch that is assigned to that accommodation chamber only. It is however likewise possible to provide a portion of the edge of the package or else all edges with such notches or incisions so that the user will use the particular notch that is situated closest to the respective accommodation chamber.

In general, sheets 1 and 2 will be plastics sheets as same are known already with the packaging of medication/drugs that can as a rule be opened by forcing through the contents. This invention is however not limited to the use of plastics sheets. One of the two sheets 1 and 2 may also be an aluminum foil, respectively laminated aluminum foils. Even the use of non-transparent plastics sheets is possible and the same holds true with regard to the use of paper sheets, for instance for one of the two sheets.

In the case of the variant according to FIG. 6, the edge 7 with the notches is provided in the interior of the package and is formed for instance by a perforation or by a partial stamping through only. It is readily possible to complement the margin formation by means of bending, if this is intended, and to use then the notches in the manner described above.

In accordance with one embodiment of the invention, it is appreciated that the ability of a child to forcefully grip an edge of the package is related to the ease of grasping the package at that notched edge, not only with the fingers, but also with portions of the hand. By corrolary, if the edge of the package is gripped by a portion of the hand, a stronger grasp may be realized as compared to the strength of a grip using the fingertips. Thus, it is desirable to so structure the package as to discourage grasping the edge of the package with a portion of the hand rather than with only the fingertips.

In accordance with a preferred embodiment of the invention, the notched edge of the package is positioned in close proximity with the chambers holding the medicaments. The raised configuration of the chambers impedes grasping of the notched edge of the package with the hand, thus discouraging attempts to open the package without use of the iterated fingertip clamping force. Preferred distances between the outer limit of the notched edge of the package and the nearest chambers are of the order of 5 to 20 millimeters.

EXAMPLES 1-4

For Example 1, the lower, non-formed Sheet 2 was a laminated sheet made of polyamide of a thickness of 40 microns and ionomer of a thickness of 80 microns. The upper Sheet 1, having chambers formed therein was a laminated sheet made of polypropylene of a thickness of 75 microns and ionomer of a thickness of 80 microns.

For Examplt 2, both the lower and upper sheets were made of a laminated sheet of polyamide of a thickness of 40 microns and polyethylene of a thickness of 80 microns.

For Example 3, the lower Sheet 2 was a laminated sheet made of polyamide of a thickness of 40 microns and polyethylene of a thickness of 75 microns. The upper sheet was a laminated sheet made of polyamide of a thickness of 60 microns and polyethylene of thickness of 75 microns.

For Examplt 4, the lower sheet was a coextruded multiple layer sheet of a thickness of 225 microns and a structure of:

Nylon/EVOH/Nylon/Tie Resin/EVA/Tie Resin/-Surlyn; where
 Nylon=polyamide
 EVOH=ethylene vinyl alcohol copolymer
 EVA=ethylene vinyl acetate copolymer
 Tie Resin=EVA modified with about 3% of an acrylic-based acid
 Surlyn=ionomer modified polyethylene The upper sheet was a laminated sheet of a thickness 100 microns, and a structure of:

Nylon/Plexar/EVA/PE/Nylon/EVOH/Nylon/Tie Resin/EVA/Tie Resin/Surlyn; where
 Plexar=anhydride modified polyolefin
 PE=polyethylene Packages were made and filled with tablets using each of the sheet combinations in the Examples 1-4. Packages from each of the examples were tested for tear strength at the notched edges on an Instron Testing Machine using conventional techniques. Table 1 shows the tear strength required to tear each package, both at the edge of the package and in the area of the tablet-containing chambers.

TABLE 1

| | Package Tear Strength - Kilograms | |
|---|---|---|
| Example Number | Edge of Package | Pill Area |
| 1 | 2.0 | 1.4 |
| 2 | 2.3 | 1.4 |
| 3 | 1.4-3.6 | 1.8-3.4 |
| 4 | 4.5 | 3.2 |

In parallel subjective testing, none of the packages could be opened by a child. Packages from Examples 1, 2, and 3 could be readily opened by adults; while some adults had difficulty opening packages from Example 4. Thus the desired package tear strength has a lower limit of approximately 1.4 kilograms, to ensure that the package cannot be opened by a child, and an upper limit of approximately 3.6-4.5 kilograms to ensure that the package is readily openable by adults.

I claim:

1. Child-proof medication/drug package in which the medication/drug is arranged between upper and lower sheets, for each medication/drug a special accommodation chamber is provided between the welded or heat-sealed sheets and is accessible by a tearing in of the package proceeding from the edge, comprising two sheets heat-sealed or welded to one another with such a strength and tenacity that they cannot be torn in without a tool at either a lateral edge, nor that the medication/drug can be forced through one of the sheets, and at least one edge there are provided notches, which notches comprise said sheets welded together so that the edges of the sheets are co-terminous in the area of the notch, where at least one such notch is assigned to each accommodation chamber and the tearing force to be mustered while making use of the notch is greater than the force than can as a rule be mustered by a child, and less than a force that cannot as a rule be mustered by an adult.

2. Package according to claim 1, wherein the notches form jointly a serrated edge.

3. Package according to claim 1 or 2, wherein the individual notches are formed by two edge portions oriented substantially at right angles to one another.

4. The invention of claim 1 wherein the lower and upper sheets comprise a lamination of polyamide and polyethylene.

5. The invention of claim 4 wherein the thickness of the polyamide in the lower sheet is about 40 microns and the thickness of the polyethylene of such sheet is about 75-80 microns.

6. The invention of claim 4 wherein the thickness of the polyamide of the upper sheet is about 40-60 microns and the thickness of the polyethylene of the upper sheet is about 75-80 microns.

* * * * *